United States Patent
McCarroll

[15] 3,663,064
[45] May 16, 1972

[54] WHEEL COVER

[72] Inventor: Raymond A. McCarroll, Grosse Pointe, Mich.

[73] Assignee: Acme Precision Products, Inc., Detroit, Mich.

[22] Filed: Jan. 27, 1970

[21] Appl. No.: 6,263

[52] U.S. Cl. .......................................... 301/37 R, 301/37 P
[51] Int. Cl. .............................................. B60b 7/06
[58] Field of Search .................... 301/37 P, 37 R, 37 S, 108 R

[56] References Cited

UNITED STATES PATENTS

| 658,588 | 9/1900 | Reynolds | 301/37 R |
| 2,073,851 | 3/1937 | Powell | 301/108 R |
| 3,512,840 | 5/1970 | Foster | 301/37 |
| 2,746,805 | 5/1956 | Gamundi | 301/37 |
| 3,265,441 | 8/1966 | Baldwin | 301/37 P |
| 3,480,329 | 11/1969 | Foster | 301/37 |
| 3,532,385 | 10/1970 | Foster | 301/37 |

*Primary Examiner*—Richard J. Johnson
*Attorney*—Olsen and Stephenson

[57] ABSTRACT

A vehicle wheel cover disposed over the side of a wheel having a drop center type rim, said cover including a disc portion with an axially inwardly extending annular flange that is telescoped into an axial flange of the drop center rim. The annular flange contains a groove in its outer surface in which is seated a radially expansible annulus which when expanded will center and lock the cover in place on the wheel. The expansible annulus can be of a type that is mechanically, hydraulically or pneumatically expanded and contracted for this purpose. The disc and annular flange portions of the cover can be formed by molding of plastic or by die casting of lightweight metals such as aluminum and zinc.

11 Claims, 10 Drawing Figures

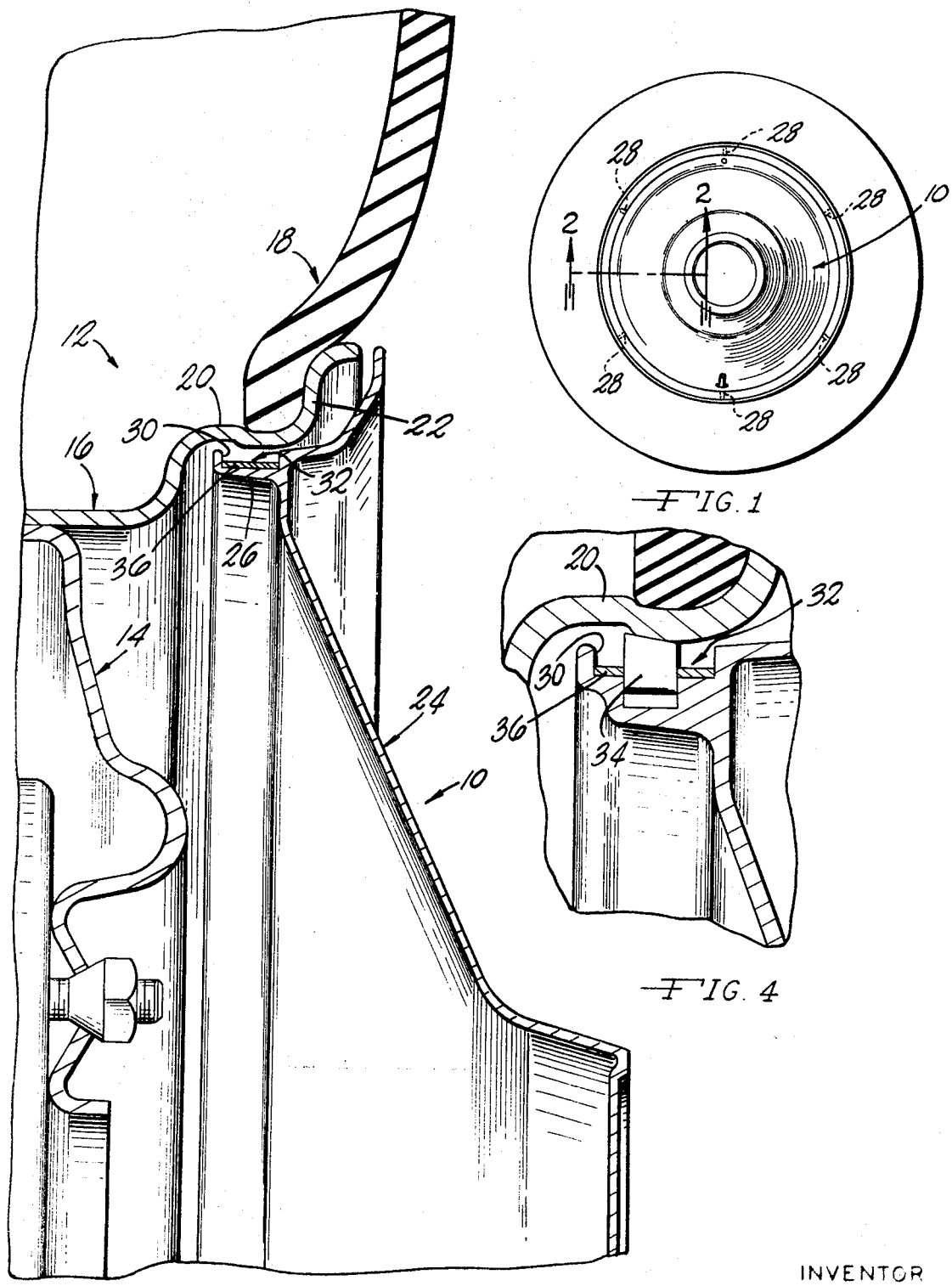

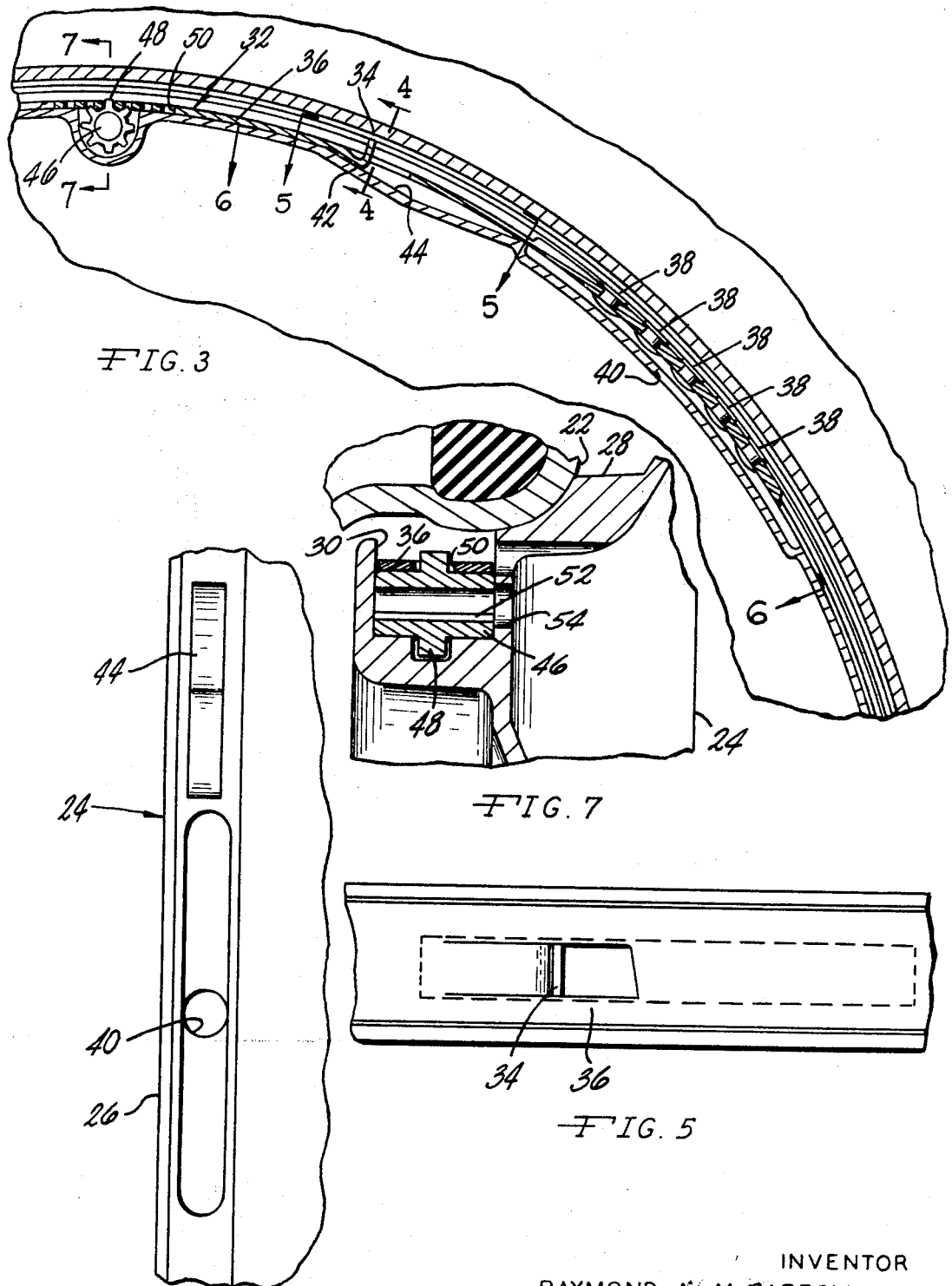

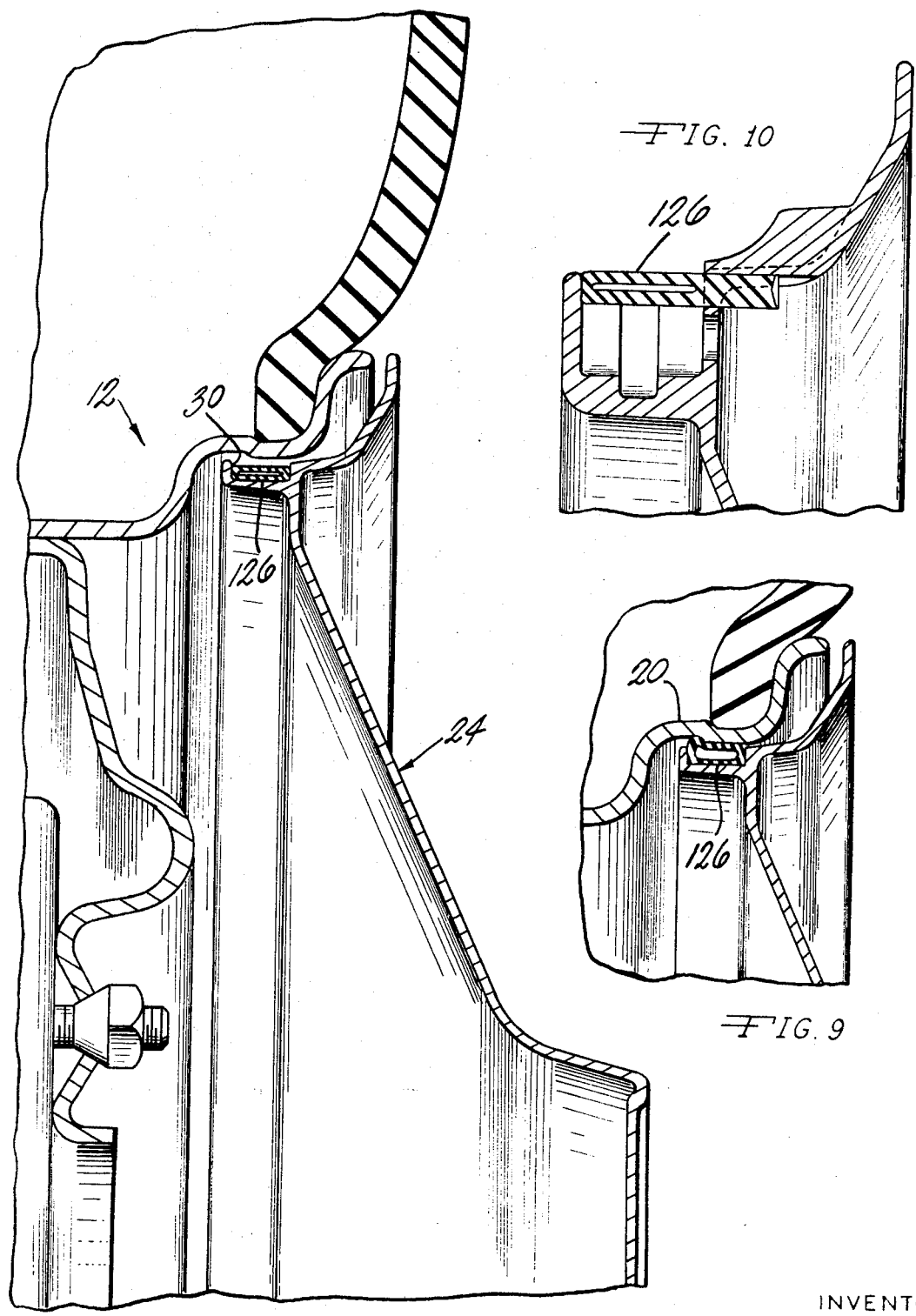

3,663,064

1

WHEEL COVER

BACKGROUND OF THE INVENTION

The present invention relates to improvements in wheel covers and wheel trims, and particularly to means for mounting the same on a vehicle wheel.

The conventional wheel covers now used on motor vehicles are generally formed from sheet metal and normally employ some form of spring fingers for bitingly gripping a flange of the drop center rim. Covers of this type can be seen, for example, in U.S. Pat. No. 2,624,634. Sheet metal covers of this type have many desirable characteristics, but they limit the designers in the style and variety of covers that can be provided. To overcome problems such as this, the designers of wheel covers frequently insert medallions or inserts in the center portions of the covers because of the more attractive and intricate designs that can be provided by the use of a molded plastic or a die cast insert. While deluxe covers such as this have advantages, they have certain inherent disadvantages, such as greater costs and greater weight. In addition, no satisfactory arrangement has been found for molding or die casting the entire cover member and thereafter mounting the same in a satisfactory manner on a vehicle wheel.

SUMMARY OF THE INVENTION

The present invention is directed to overcome certain of the shortcomings of the prior art and to provide a wheel cover member that can be formed by molding or die casting operations and which is then provided with suitable retention means.

It is an object of the present invention to provide an improved wheel cover that is constructed and arranged so that it incorporates all the desirable features of the aforesaid deluxe cover, but which has a relatively low weight and cost and which has improved retention means to permit more general use of a die cast lightweight metal or a molded plastic without requiring a sheet metal annulus which incorporates the conventional biting tooth type of retention means heretofore used.

According to a preferred form of the present invention, a cover assembly is provided which can be mounted on the side of a wheel member, said cover assembly comprising a molded or die cast cover member with an axially inwardly directed flange adjacent to its outer periphery, said flange having a radially outwardly facing groove, and a radially expansible annulus is seated in said groove for retaining said cover member on a wheel member. Means are provided for selectively expanding and contracting said annulus for securing the cover assembly to the wheel member and for releasing the cover assembly from such wheel member.

In a preferred form of the invention, the annulus includes a metal band having perforations, and spring fingers are struck out of the band at spaced intervals. The groove has ramps or cam surfaces spaced about the circumference of the groove corresponding to the spacing of the spring fingers so that when the band is moved to one position the fingers will be in a retracted position, and when the band is moved to a second position the fingers will be projected radially outwardly so that they engage the flange of the rim on which they are mounted. A pinion gear is journaled in the cover member and has its teeth in mesh with perforations in the band for moving the band between its first and second positions. Thus, a cover member can be die cast or formed by molding of plastic materials as one integral piece, thereby enabling the designers to use substantially more attractive designs for the cover.

Other arrangements can also be used for securing the cover on the wheel. Thus, it is contemplated that a tube can be inserted in the annular groove in place of the metal belt, and the tube can be pneumatically or hydraulically inflated or deflated as required to secure the cover in place on the rim or to release it from the rim.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a side elevational view of a wheel cover embodying the present invention mounted on a vehicle wheel;

FIG. 2 is an enlarged fragmentary section taken on the line 2—2 of FIG. 1, illustrating one modification of the present invention wherein mechanical retention means are provided;

FIG. 3 is a fragmentary section taken on a vertical plane through the retention means of the cover and the associated portions of the wheel;

FIG. 4 is a fragmentary section taken on the line 4—4 of FIG. 3;

FIG. 5 is a fragmentary view taken on the line 5—5 of FIG. 3;

FIG. 6 is a fragmentary view taken on the line 6—6 of FIG. 3;

FIG. 7 is a fragmentary view taken on the line 7—7 of FIG. 3;

FIG. 8 is a fragmentary section similar to that of FIG. 2, but illustrating a modified form of the present invention wherein pneumatic or hydraulic retention means are provided;

FIG. 9 is a fragmentary view similar to that of FIG. 8 but showing the retention means in its expanded position to hold the cover member on the wheel member; and FIG. 10 is a fragmentary section similar to that of FIG. 7, but showing the means for expanding and contracting the modified annulus of the wheel cover.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The wheel cover or cover assembly 10 is constructed and arranged to be applied to the outer side of a vehicle wheel member 12 which includes the wheel body 14 and the drop center type rim 16. A pneumatic tire 18 is shown mounted on wheel member 12. The tire rim 16 is of a conventional type and includes an intermediate axial flange or outwardly extending annular flange 20, and a side or radial flange 22 which extends radially outwardly from the axial flange 20.

The cover assembly 10 includes a cover member 24 which has an ornamental outer side which conceals the wheel body 14 and the portions of the tire rim 16 and has an axially inwardly extending annular flange 26 adjacent to its outer periphery. As can be seen in FIG. 2, the axially inwardly extending flange 26 of the cover member 24 is telescoped in radially spaced relation into the outwardly extending annular flange 20 of the wheel member 12.

The wheel member 24 includes a plurality of bosses 28 spaced around its outer periphery, as seen best in FIGS. 1 and 7, which are adapted to seat against the side flange 22 to limit the extent of which the axially inwardly extending annular flange 26 can telescope into the outwardly extending annular flange 20. The inwardly extending annular flange 26 defines in its outer surface a groove 30 in which is seated an annulus 32 whose outer circumference defined by the terminal ends of a plurality of fingers 34 is radially expansible and contractable to provide centering and holding means for the cover member 24 on the wheel member 12. The annulus 32 includes a ferrous or non-ferrous metal belt 36 out of which the spring fingers 34 have been struck and formed to the configurations best seen in FIGS. 3, 4 and 5. The band 36 encircles the inwardly extending annular flange 26 and the ends thereof are secured together by suitable means, such as the plurality of rivets 38, shown in FIG. 3. These rivets can be secured together over the ends of the belt 36 by utilizing the aperture 40 provided in the flange 26. When forming the spring fingers 34, the terminal ends of the fingers 34 will be located normally a relatively short distance above the surface of the band 36, and the portion of the finger at the bend 42 will be located normally below the undersurface of the band 36.

The cover member 24 has a plurality of ramps or cam surfaces 44, corresponding in numbers and spacings to the spring fingers 34 of the belt 36. Thus, when the band 36 is seated in the groove 30, the spring fingers 34 can assume a first position wherein the terminal ends of the spring fingers 34 are located a relatively short distance above the outer surface of the band 36 and the bends 42 can be located in what can be considered the bottoms of the ramps or cam surfaces 44. Thereafter, if the band 36 is rotated relative to the cover member 24, the bend 42 of each finger 34 will travel up the ramp or cam surface 44 causing the terminal end of each finger 34 to be projected radially outwardly. When this occurs, the terminal ends of the fingers 34 can engage the outwardly extending annular flange 20, in the position shown in FIG. 4 for centering and locking the cover member 24 on the wheel member 12.

For the purpose of moving the band 36 between the two positions, the cover member 24 has journaled in it for rotation a pinion gear 46 which has its teeth 48 in mesh with the perforations 50 in the band 36. A hole 52 is provided in the front surface of the cover member 34 to permit insertion of a tool therethrough into the interior 54 of the pinion gear 46. Preferably the interior of the gear 46 is adapted to receive a wrench, or the like, so that rotation of the gear 46 will serve to move the band in either one direction or the other between its first and second operative positions.

From the foregoing description it can be understood that a simple and effective centering and retention means has been provided for a wheel cover assembly wherein the cover member 24 can be formed entirely by a die casting or injection molding operation, and the conventional sheet metal retention flange heretofore required for retaining the cover on the wheel is not needed. The cover can be constructed relatively light in weight and it will have all of the attractive and ornamental appearances of plastic or die cast products.

The invention is not limited to the specific retention means disclosed with respect to the embodiments of FIGS. 1–7. It is also contemplated that in addition to the mechanical means disclosed for radially expanding the retention means, suitable pneumatic or hydraulic means may also be employed. One such embodiment is disclosed in FIGS. 8–10. As there shown, a cover member 24 is provided which is constructed identically the same as the cover member described with respect to the embodiment of FIGS. 1–7. However, in this embodiment of the invention a modified form of the radially expansible and contractable annulus 126 is provided. As shown, the annulus 26 is a tube which is seated in the groove 30 and when inflated to the position shown in FIG. 9, serves to retain the cover member 24 on the outwardly extending flange 20 of the wheel member 12. As shown in FIG. 10, the cover member 24 can be used interchangeably with either the modification of the annulus described in the first embodiment or in connection with the present embodiment of the radially expansible and contractable annulus 126 is employed, the gear 46 can be omitted from the pocket 56 in which it is normally seated. Instead, a conventional type of mechanism for receiving a needle valve is provided at the side of the annulus 126 for inflating and deflating the tube or annulus 126. Either pneumatic or hydraulic fluids can be used for inflating the tube or annulus 126.

The illustrated embodiments disclose the cover member 24 mounted on the rim 16 of the wheel member 12. It is to be understood that the present invention in appropriate instances may be carried out by mounting the cover on other suitable flanges of a wheel member and that the annular flange of a wheel member also may be telescoped into the annular flange of the cover member with the expansible annulus positioned therebetween.

It is claimed:

1. The combination of a wheel member having an axially outwardly extending annular flange, a cover member mounted in position on the side of said wheel member and having an axially inwardly extending flange, one of said annular flanges being telescoped into the other annular flange, a radially expansible and contractable annulus carried by one of said annular flanges for limited relative rotation with respect thereto including a band of fixed circumferential length and a plurality of radially movable retention elements associated therewith at circumferentially spaced intervals, and means for rotating said band relative to said one annular flange and as an incident to rotation of the band to one position to displace said retention elements radially in one direction for removal of the cover member from the wheel member and as an incident to rotation of the band to a second position to displace said retention elements radially in the other direction for securing the cover on the wheel member.

2. The combination as defined in claim 1, wherein said outwardly extending annular flange forms a part of the rim of said wheel member and said inwardly extending annular flange forms a part of the outer periphery of said cover member and is telescoped into said outwardly extending annular flange.

3. The combination as defined in claim 2, wherein said inwardly extending annular flange has a groove in its radially outer surface, and said annulus is seated in said groove.

4. The combination as defined in claim 3, wherein said band is circumferentially movable in said groove between first and second positions and said retention elements are spring fingers located at circumferentially spaced intervals, and said means includes correspondingly spaced cam surfaces adapted to be engaged by said fingers when said band is moved from said first position to said second position to project said fingers radially outwardly into engagement with said outwardly extending flange, and an actuating element connected to said band to move said band between said first and second positions.

5. The combination as defined in claim 4, wherein said actuating element comprises a gear rotatably mounted in said cover member, and said band has perforations in mesh with the teeth of said pinion gear.

6. The combination as defined in claim 3, wherein said cover member is a one-piece molded structure.

7. The combination as defined in claim 6, wherein said cover member is formed from one of a group of materials adapted for injection molding or die casting including organic plastics, zinc and aluminum.

8. The combination as defined in claim 2, wherein cooperating limit means are provided on said wheel member and said cover member to limit the extent that said inwardly extending annular flange can be telescoped into said outwardly extending annular flange.

9. The combination as defined in claim 8, wherein said cooperating limit means include a plurality of bosses spaced around the circumference of the cover member and seated on a side flange of said rim.

10. A cover assembly for mounting on the side of a wheel member comprising a cover member with an axially inwardly directed flange adjacent to its outer periphery, said flange having a radially outwardly facing groove, a radially expansible annulus for retaining said cover member on a wheel member, said annulus including a band of fixed length movable in said groove between first and second positions and spring fingers located at spaced circumferential intervals relative to said groove, and means for selectively expanding and contracting said annulus radially for securing said assembly to and releasing said assembly from said wheel cover, said means including circumferentially spaced cam surfaces engageable by said fingers when said band is moved from said first position to said second position to project said fingers radially outwardly.

11. A cover assembly as defined in claim 10, wherein said means includes a rotatable element mounted in said cover member and having teeth projecting into said groove, and said band has perforations in mesh with said teeth.

* * * * *